(12) United States Patent
Pin-Chien

(10) Patent No.: US 6,400,355 B1
(45) Date of Patent: Jun. 4, 2002

(54) POINTING STICK DEVICE WITH INCREASED SENSITIVITY IN THE VERTICAL DIRECTION

(75) Inventor: Liao Pin-Chien, Tao-Yuan (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 09/546,322

(22) Filed: Apr. 7, 2000

(30) Foreign Application Priority Data

Aug. 27, 1999 (TW) .......................................... 88114763

(51) Int. Cl.[7] .................................................. G09G 5/08
(52) U.S. Cl. .................. 345/161; 345/157; 74/471 XY; 341/34; 463/38
(58) Field of Search ................................ 345/156, 157, 345/161, 160; 200/6 A; 341/34; 74/471 XY; 463/38

(56) References Cited

U.S. PATENT DOCUMENTS

| | | | | |
|---|---|---|---|---|
| 5,043,709 A | * | 8/1991 | Kim .......................... 200/6 A |
| 5,140,313 A | * | 8/1992 | Wen .......................... 340/709 |
| 5,894,301 A | * | 4/1999 | Seffernick .................... 345/160 |
| 5,949,354 A | * | 9/1999 | Chang ........................ 345/161 |
| 5,966,117 A | * | 10/1999 | Seffernick et al. ........... 345/161 |
| 6,002,388 A | * | 12/1999 | Seffernick et al. ........... 345/161 |
| 6,184,865 B1 | * | 2/2001 | Zimmerman et al. ....... 345/160 |

* cited by examiner

Primary Examiner—Lun-Yi Lao
(74) Attorney, Agent, or Firm—Winston Hsu

(57) ABSTRACT

The present invention provides a pointing stick device for use with a computer. The pointing stick device has a base plate having an aperture, a stick having a lower portion, at least one strain gauge attached on the lower portion, and a binding compound filling the space between the lower portion of the stick and the aperture of the base plate. The lower portion of the stick is tapered. The binding compound covers the strain gauges and fixes the lower portion of the stick vertically in the aperture of the base plate. When the stick is vertically depressed, the strain gauge installed on the lower portion of the stick senses the vertical downward pressure from reaction forces transmitted through the binding compound and generates the corresponding sensing signals.

15 Claims, 8 Drawing Sheets

POINTING STICK DEVICE WITH INCREASED SENSITIVITY IN THE VERTICAL DIRECTION

BACKGROUND OF THE INVENTION

1. Field of the Invention

The present invention relates to a pointing stick device, and more particularly, to a pointing stick device with increased sensitivity in the vertical direction.

2. Description of the Prior Art

Pointing devices, such as keyboards, mice, joysticks and remote control devices, are widely used computer peripherals for controlling the movement, position and function of a cursor on a computer screen. The prior art pointing device can only control the two-dimensional movement of the cursor. This means that, after moving the cursor to the desired position, another button must be clicked to execute the desired function. Moreover, as 3-D pictures and 3-D animations become more widespread, a pointing device that can generate three-dimensional, rather than two-dimensional, signals will prove more convenient for users when controlling movements in a 3-D space.

Please refer to FIG. 1. FIG. 1 is a cross-sectional diagram of a prior art pointing stick device 10. The prior art pointing stick device 10 comprises a column-shaped stick 12 for controlling the two-dimensional movements of a cursor (not shown) on a computer screen. The stick 12 has an upper portion 13 and a lower portion 15. The pointing stick device 10 further comprises a base plate 20 having an aperture 21 for fixing the stick 12, a plurality of strain gauges 14 vertically installed on the lower portion 15 of the stick 12, and a binding compound 22 filling the space between the lower portion 15 of the stick 12 and the aperture 21 of the base plate 20. The strain gauges 14 sense pressure and generate corresponding sensing signals. The binding compound 22 fixes the lower portion 15 of the stick 12 vertically into the aperture 21 of the base plate 20.

Please refer to FIG. 2. FIG. 2 is a cross-sectional diagram of another prior art pointing stick device 30. The main difference between the pointing stick device 30 and the pointing stick device 10 is that the pointing device 30 has a cover ring 26 installed on the periphery of the binding compound 22. When the stick is bent by a horizontal force, the cover ring 26 will help generate the reaction forces that squeeze the plurality of strain gauges 14 installed on the stick 12, and thereby cause the strain gauges 14 to generate the corresponding signals.

Please refer to FIG. 3 and FIG. 4. FIG. 3 is a cross-sectional diagram of the pointing stick device 10 or 30 shown in FIG. 1 or FIG. 2 with a horizontal force acting on the stick 12. The central line shown in FIG. 3 represents the bending direction of the stick 12 with the horizontal force. The bending of the stick 12 caused by the horizontal force will make the strain gauge 14 generate bending strain signals $S_{x1}$, $S_{y1}$. FIG. 4 is a cross-sectional diagram of the pointing stick device 10 or 30 shown in FIG. 1 or FIG. 2 with a vertical force acting on the stick 12. The central line shown in FIG. 4 represents the direction of compression of the stick 12 with the vertical force. The compression of the stick 12 caused by the vertical force will make the strain gauge 14 generate compressive strain signals $S_{z1}$) When a force is applied to the pointing stick device 10, 30, the base plate 20 and the binding compound 22 will squeeze the strain gauges which then generate the strain signals $S_{x1}$, $S_{y1}$, and $S_{z1}$.

However, the upper and lower portions 13, 15 of the stick 12 of the prior art pointing stick devices 10, 30 are of a vertical, columnar shape, as is the corresponding aperture 21 of the base plate 20. Thus, when a force is applied to the pointing stick device 10, 30, the strain signals $S_{z1}$ in the Z direction are too insignificant to use. Although, in the pointing stick device 30, there is the cover ring 26 installed on the lower portion 15 of the stick 12, it still cannot intensify the strain signals $S_{z1}$ in the Z direction. Furthermore, adding the cover ring 26 on the prior art pointing stick device 30 requires additional materials, gluing and working hours, raising production costs. Accordingly, how to design a pointing stick device with increased sensitivity in the X, Y (horizontal) and Z (vertical) directions becomes the goal for a designer to strive for.

SUMMARY OF THE INVENTION

It is therefore a primary objective of the present invention to provide a pointing stick device with increased sensitivity in the vertical direction to solve the above mentioned problems.

In a preferred embodiment, the present invention provides a pointing stick device for use with a computer. The pointing stick device comprises:

- a base plate having an aperture;
- a stick having an upper portion, and a lower portion with a tapering section;
- at least one strain gauge installed on the lower portion for sensing pressure and generating corresponding sensing signals; and
- a binding compound filling the space between a periphery of the lower portion of the stick and the aperture of the base plate and covering the strain gauge, for fixing the lower portion of the stick vertically in the aperture of the base plate;
- wherein when the stick is vertically depressed, the strain gauge installed on the periphery of the lower portion of the stick can sense vertical downward pressure from reaction forces transmitted through the binding compound and generate the corresponding sensing signals.

It is an advantage of the present invention that the pointing stick device can increase the strain gauge sensitivity, especially in the vertical direction.

These and other objectives and advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 5:
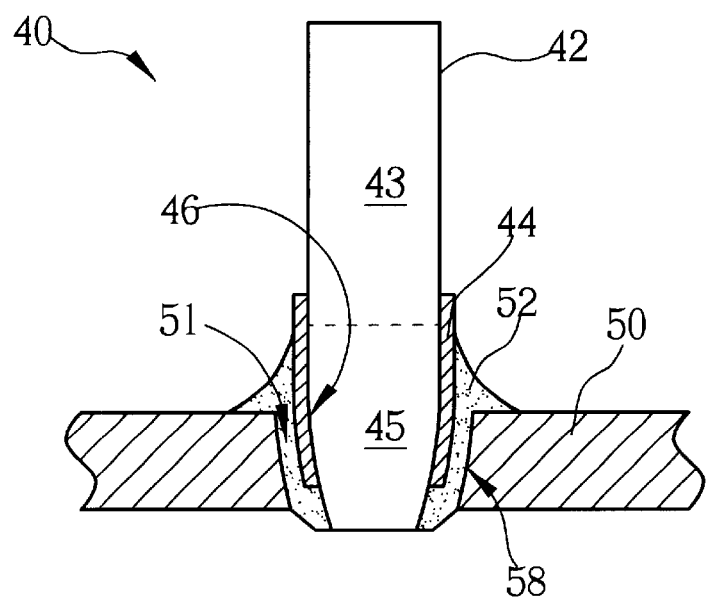
FIG. 5 is a cross-sectional diagram of the present invention first embodiment pointing stick device 40.

Please refer to FIG. 5. FIG. 5 is a cross-sectional diagram of the present invention first embodiment pointing stick device 40. The pointing stick device 40 comprises a stick 42, a base plate 50, at least one strain gauge 44 and a binding compound 52. The stick 42 comprises an upper portion 43 and a lower portion 45. The lower portion 45 has a tapering section 46. The base plate 50 has an aperture 51 with a conic surface 58 for containing and fixing the lower portion 45 of the stick 42.

The binding compound 52 is used to fill the space between the lower portion 45 of the stick 42 and the aperture 51 of the base plate 50 in order to fix the lower portion 45 of the stick 42 vertically in the aperture 51 of the base plate 50. The binding compound 52 is a solid material, such as epoxy.

The tapering section 46 of the stick 42 has four faces, and a strain gauge 44 is installed on each of these four faces to sense the pressure on the four faces and generate the corresponding sensing signals. The lower portions of the strain gauges 44 extend into the lower region 45 of the stick 42 and are covered by the binding compound 52. Thus, the lower portions of the strain gauges 44 can easily sense the vertical downward pressure of the stick 42.

As known from the prior art method, the lower portions of the strain gauges 44 are electrically connected to a certain circuit (not shown) to output the generated sensing signals. If the base plates 50, 90 are printed circuit boards, the circuit can be directly printed on them; if the base plate 50, 90 is made of some other materials such as plastic or metal, the circuit can be printed on a flexible printed circuit board, and then glued to the base plate 50, 90.

Figure 6:
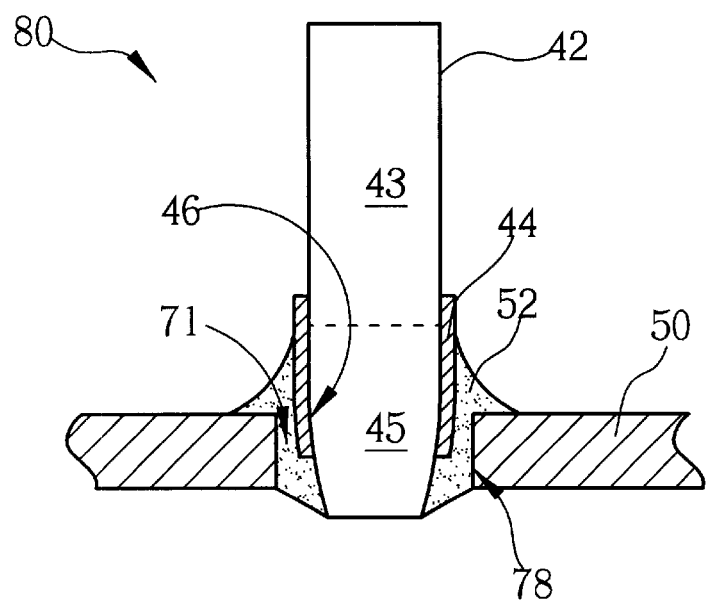
FIG. 6 is a cross-sectional diagram of the present invention second embodiment pointing stick device 80.

Please refer to FIG. 6. FIG. 6 is a cross-sectional diagram of the present invention second embodiment pointing stick device 80. The main difference between the pointing stick device 80 and the pointing stick device 40 shown in FIG. 5 is in the shape between the two apertures 51, 71 of the pointing stick device 40, 80 respectively. The aperture 71 is of a vertical, columnar-shaped surface 78 rather than the downwardly tapering conic shape of the aperture 51 of the pointing stick device 40. The lower portion 45 of the stick 42 of the pointing stick device 80 shown in FIG. 6 still has a tapering section 46 like that of the pointing stick device 40 shown in FIG. 5.

Figure 7:
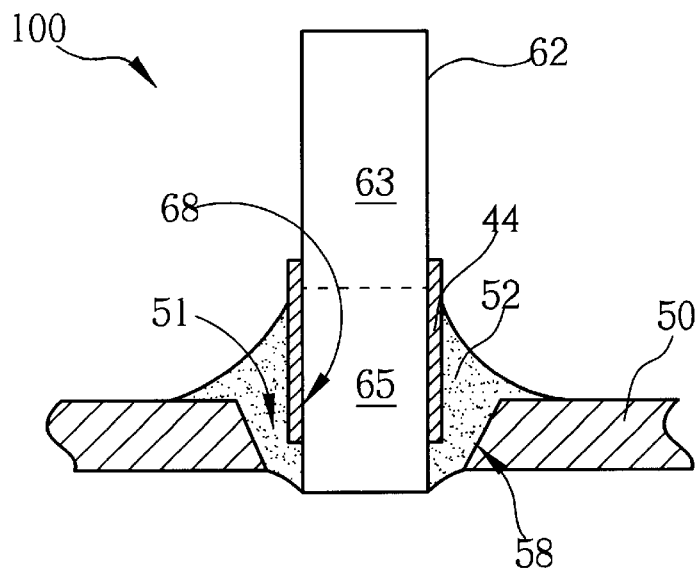
FIG. 7 is a cross-sectional diagram of the present invention third embodiment pointing stick device 100.

Please refer to FIG. 7. FIG. 7 is a cross-sectional diagram of the present invention third embodiment pointing stick device 100. The main difference between the pointing stick device 100 and the pointing stick device 40 shown in FIG. 5 is in the shape of the two lower portions 45, 65 of the pointing stick device 40, 100 respectively. The lower portion 65 of the stick 62 of the pointing stick device 100 is of a vertical, columnar-shaped surface 68 rather than the tapering section 46 of the lower portion 45 of the stick 42 of the pointing stick device 40. The aperture 51 of the base plate 50 of the pointing stick device 100 shown in FIG. 7 is still a downwardly tapering conic shape, like that of the pointing stick device 40 shown in FIG. 5.

The lower portion 65 of the stick 62 is a four-faced columnar shape, and the strain gauges 44 are installed on each of the four faces of the lower portion 65 to sense the pressure on the four faces and generate the corresponding sensing signals. The lower portions of the strain gauges 44 extend into the lower region 65 of the stick 62 and are covered by the binding compound 52. Thus, the lower portions of the strain gauges 44 can easily sense the vertical downward pressure of the stick 62.

Please refer to FIG. 8 to FIG. 13, FIG. 15 and FIG. 16. These figures show the situations when horizontal and vertical forces are applied to the present invention pointing stick devices 40, 80, 100, 120. The arrows labeled $F_x$ and $F_y$ represent the horizontal forces, and the arrows labeled $F_z$ represent the vertical forces. These pointing stick devices can be used to control the movements and position of a cursor on a computer screen in the X and Y directions and the function of the cursor. The pointing stick devices can also control the three-dimensional movements of a cursor in the X, Y and Z directions.

Figure 1:
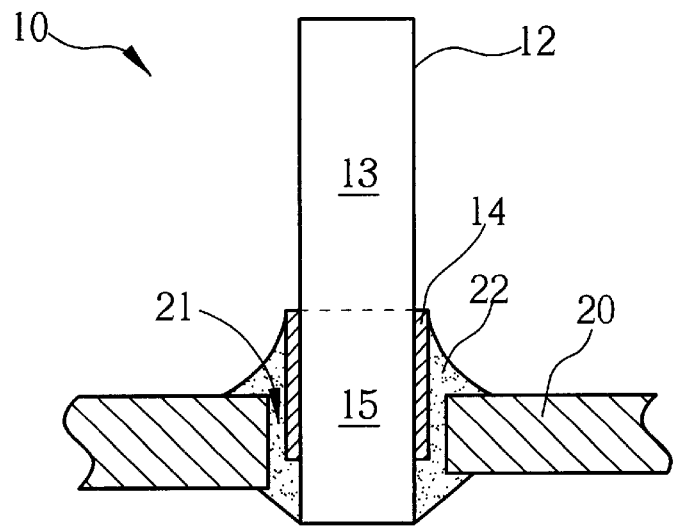
FIG. 1 is a cross-sectional diagram of a prior art pointing stick device 10.
Figure 2:
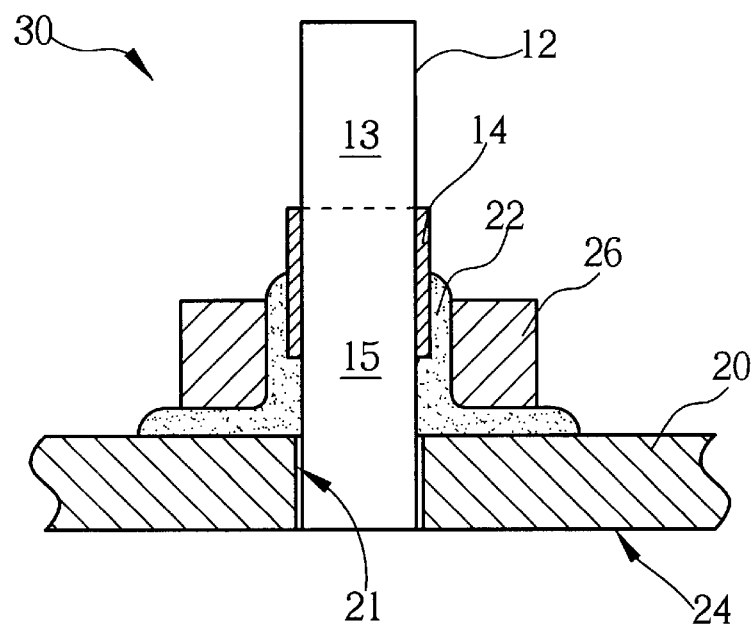
FIG. 2 is a cross-sectional diagram of another prior art pointing stick device 30.
Figure 3:
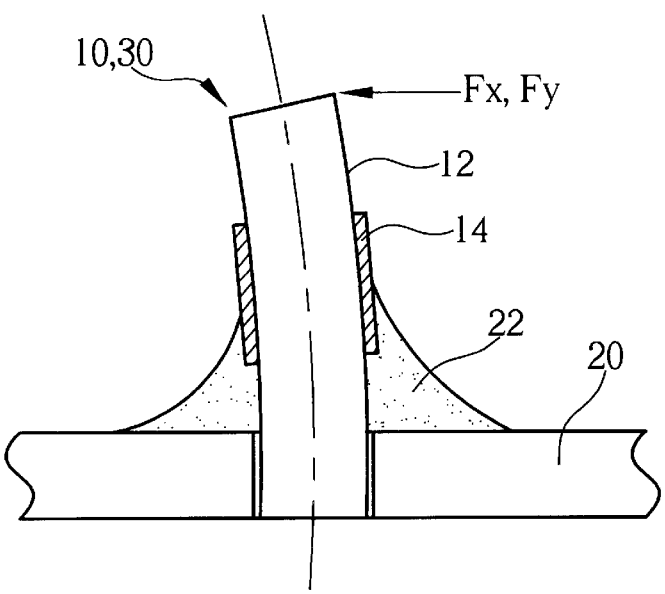
FIG. 3 is a cross-sectional diagram of the pointing stick device 10 or 30 shown in FIG. 1 or FIG. 2 with a horizontal force acting on the stick 12.
Figure 4:
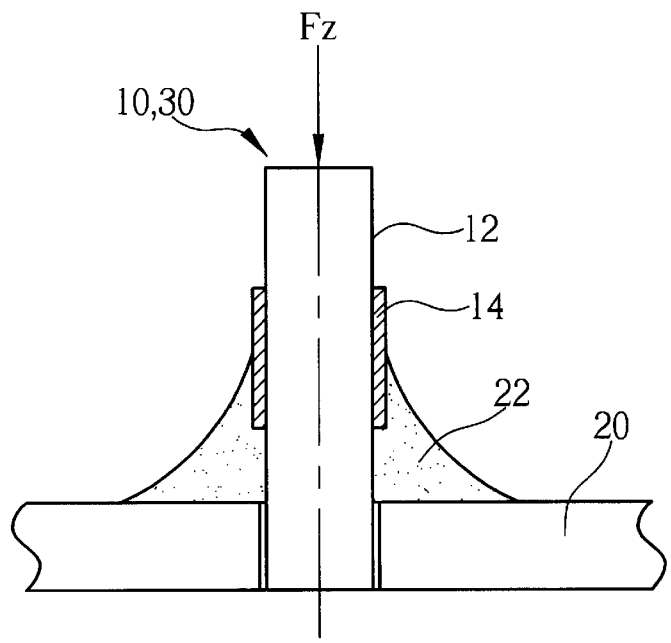
FIG. 4 is a cross-sectional diagram of the pointing stick device 10 or 30 shown in FIG. 1 or FIG. 2 with a vertical force acting on the stick 12.
Figure 8:
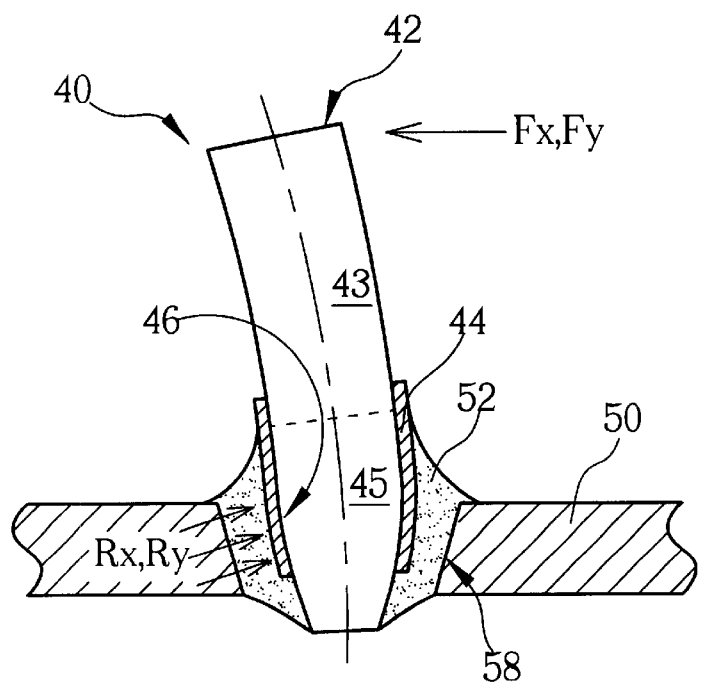
FIG. 8 is a cross-sectional diagram of the present invention first embodiment pointing stick device 40 under a horizontal force in the X and Y directions.
Figure 9:
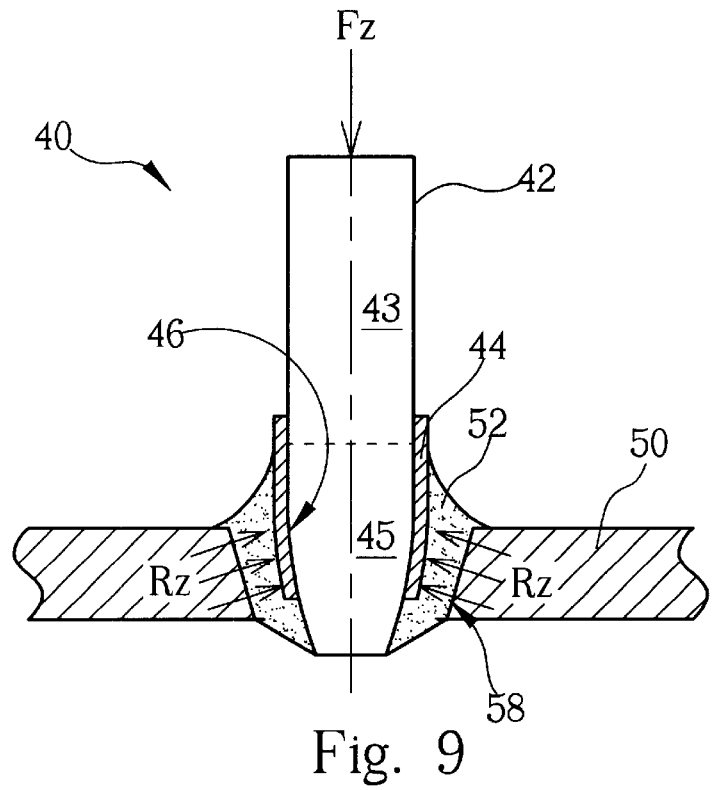
FIG. 9 is a cross-sectional diagram of the present invention first embodiment pointing stick device 40 under a vertical force in the Z direction.

Please refer to FIG. 8. FIG. 8 is a cross-sectional diagram of the present invention first embodiment pointing stick device 40 under a horizontal force in the X and Y directions. The central line shown in FIG. 8 represents the bending direction of the stick 42 from the horizontal force. When the present invention pointing stick device 40 undergoes a horizontal force $F_x$, $F_y$ in the X and Y directions, as with the prior art pointing stick device shown in FIG. 3, the bending of the stick 42 from the horizontal force makes the strain gauges 44 generate bending strain signals $S_{x1}$, $S_{y1}$. In addition, the normal reaction forces $R_x$, $R_y$, generated from the horizontal force $F_x$, $F_y$ through the binding compound 52, squeeze the strain gauges 44 to make the strain gauges 44 generate strain signals $S_{x2}$, $S_{y2}$. In this case, the totality of strain signals of the present invention pointing device 40 under a horizontal force in the X and Y directions is $S_{x1}+S_{x2}$, $S_{y1}+S_{y2}$ Please refer to FIG. 9. FIG. 9 is a cross-sectional diagram of the present invention first embodiment pointing stick device 40 under a vertical force in the Z direction. The central line shown in FIG. 9 represents the direction of compression of the stick 42 from the vertical force. When a vertical force $F_z$ in the Z direction is applied to the present invention pointing stick device 40, as with the prior art pointing stick device shown in FIG. 4, the compression of the stick 42 caused by the vertical force makes the strain gauges 44 generate compressive strain signals $S_{z1}$. In addition, the normal reaction forces $R_z$, generated from the vertical force $F_z$ through the binding compound 52, squeeze the strain gauges 44, causing the strain gauges 44 to generate additional strain signals $S_{z2}$. In this case, the totality of strain signals of the present invention pointing device 40 under a vertical force in the Z directions is $S_{z1}+S_{z2}$.

Figure 10:
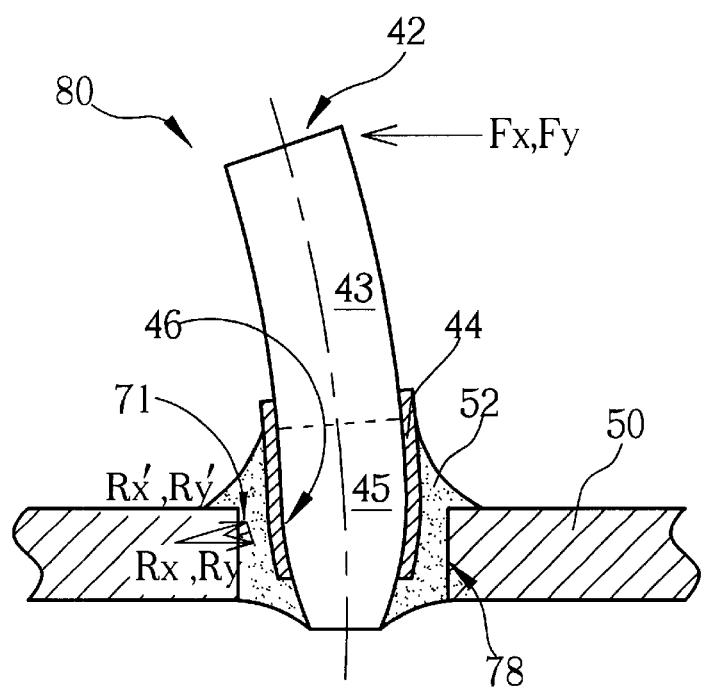
FIG. 10 is a cross-sectional diagram of the present invention second embodiment pointing stick device 80 under a horizontal force in the X and Y directions.

Please refer to FIG. 10. FIG. 10 is a cross-sectional diagram of the present invention second embodiment pointing stick device 80 under a horizontal force in the X and Y directions. The central line shown in FIG. 10 represents the bending direction of the stick 42 from the horizontal force. When a horizontal force $F_x$, $F_y$ in the X and Y directions is applied to the present invention pointing stick device 80, as with the prior art pointing stick device shown in FIG. 3, the bending of the stick 42 caused by the horizontal force causes the strain gauges 44 to generate bending strain signals $S_{x1}$, $S_{y1}$. In addition, the reaction forces $R_x'$, $R_y'$, a normal component (normal to the tapering section 46 surface) of the reaction forces $R_x$, $R_y$ generated from the horizontal force $F_x$, $F_y$ through the binding compound 52, squeeze the strain gauges 44, causing them to generate strain signals $S_{x2}'$, $S_{y2}'$. In this case, the totality of strain signals of the present invention pointing device 80 is $S_{x1}+S_{x2}'$, $S_{y1}+S_{y2}'$.

Figure 11:
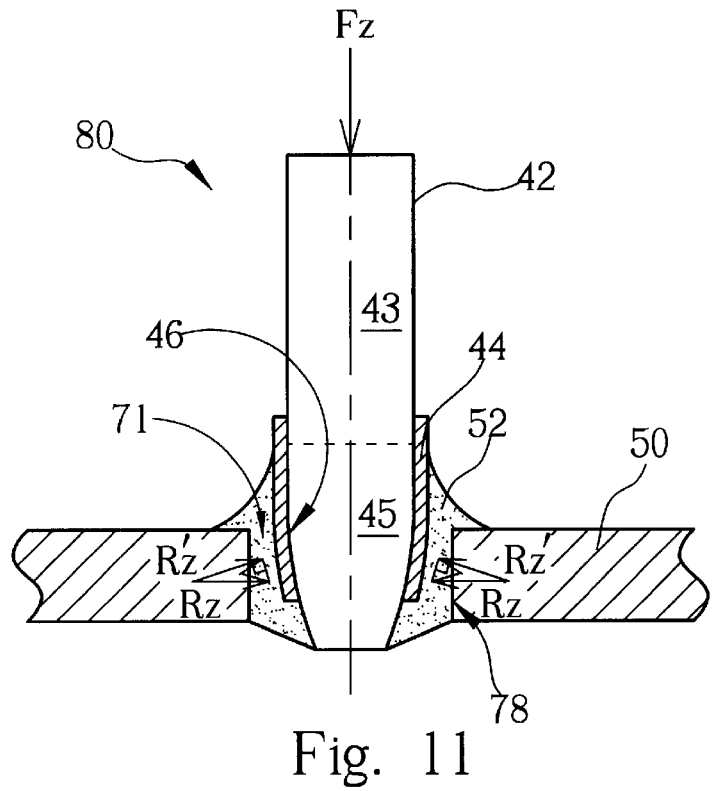
FIG. 11 is a cross-sectional diagram of the present invention second embodiment pointing stick device 80 under a vertical force in the Z direction.

Please refer to FIG. 11. FIG. 11 is a cross-sectional diagram of the present invention second embodiment pointing stick device 80 under a vertical force in the Z direction. The central line shown in FIG. 11 represents the direction of compression of the stick 42 from the vertical force. When a vertical force $F_z$ in the Z direction is applied to the present invention pointing stick 80, as with the prior art pointing stick device shown in FIG. 4, the compression of the stick 42 caused by the vertical force makes the strain gauges 44 generate compressive strain signals $S_{z1}$. In addition, the normal reaction forces $R_z'$, a normal component (normal to the tapering section 46 surface) of the reaction forces $R_z$ generated from the vertical force $F_z$ through the binding compound 52, squeeze the strain gauges 44, causing them to generate strain signals $S_{z2}'$. In this case, the totality of strain signals of the present invention pointing device 80 under a vertical force in the Z direction is $S_{z1}+S_{z2}'$.

Figure 12:
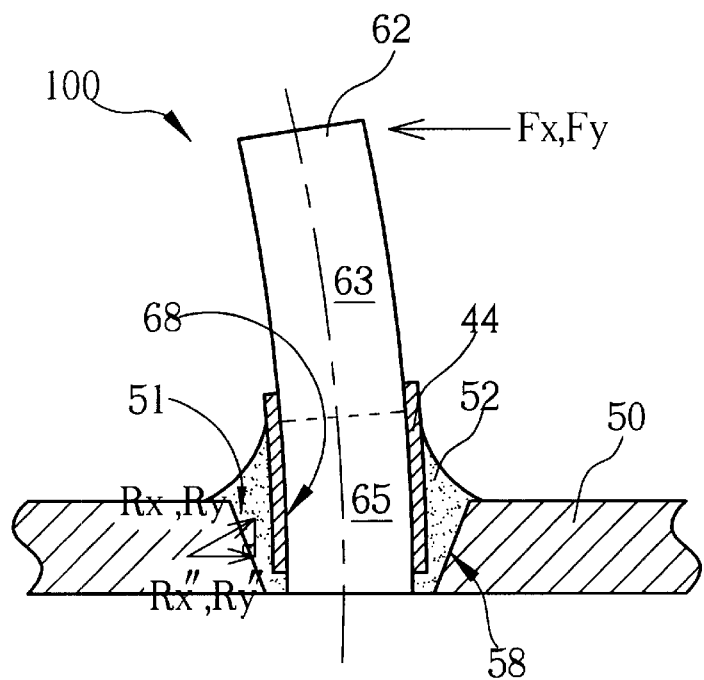
FIG. 12 is a cross-sectional diagram of the present invention third embodiment pointing stick device 100 under a horizontal force in the X and Y directions.

Please refer to FIG. 12. FIG. 12 is a cross-sectional diagram of the present invention third embodiment pointing stick device 100 under a horizontal force in the X and Y directions. The central line shown in FIG. 12 represents the bending direction of the stick 62 from the horizontal force. When a horizontal force $F_x$, $F_y$, in the X and Y directions is applied to the present invention pointing stick device 100, as with the prior art pointing stick device shown in FIG. 3, the bending of the stick 62 makes the strain gauges 44 generate bending strain signals $S_{x1}$, $S_{y1}$. In addition, the reaction forces $R_x''$, $R_y''$, a normal component (normal to the column-shaped surface 68) of the reaction forces $R_x$, $R_y$ (normal to the aperture's bowl-shaped surface 58) generated from the horizontal force $F_x$, $F_y$ through the binding compound 52, squeeze the strain gauges 44, causing the strain gauges 44 to generate strain signals $S_{x2}''$, $S_{y2}''$. In this case, the totality of strain signals of the present invention pointing device 100 under a horizontal force is $S_{x1}+S_{x2}''$, $S_{y1}+S_{y2}''$.

Figure 13:
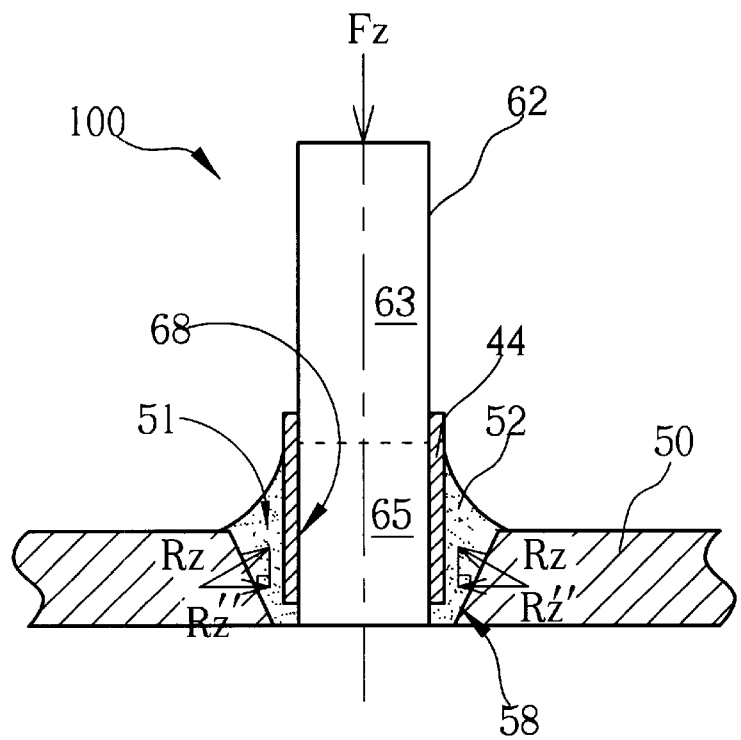
FIG. 13 is a cross-sectional diagram of the present invention third embodiment pointing stick device 100 under a vertical force in the Z direction.

Please refer to FIG. 13. FIG. 13 is a cross-sectional diagram of the present invention third embodiment pointing stick device 100 under a vertical force in the Z direction. The central line shown in FIG. 13 represents the direction of compression of the stick 62 from the vertical force. When a vertical force $F_z$ is applied to the present invention pointing stick device 100, as with the prior art pointing stick device shown in FIG. 4, the compression of the stick 62 causes the strain gauge 44 to generate compressive strain signals $S_{z1}$. Additionally, though, the normal reaction forces $R_z''$, a normal component (normal to the column-shaped surface 68) of the reaction forces $R_z$. (normal to the aperture's bowl-shaped surface 58) generated from the vertical force $F_z$, through the binding compound 52, squeeze the strain gauges 44 to generate strain signals $S_{z2}''$. In this case, the totality of strain signals of the present invention pointing device 100 under a vertical force in Z direction is $S_{z1}+S_{z2}''$.

Figure 14:
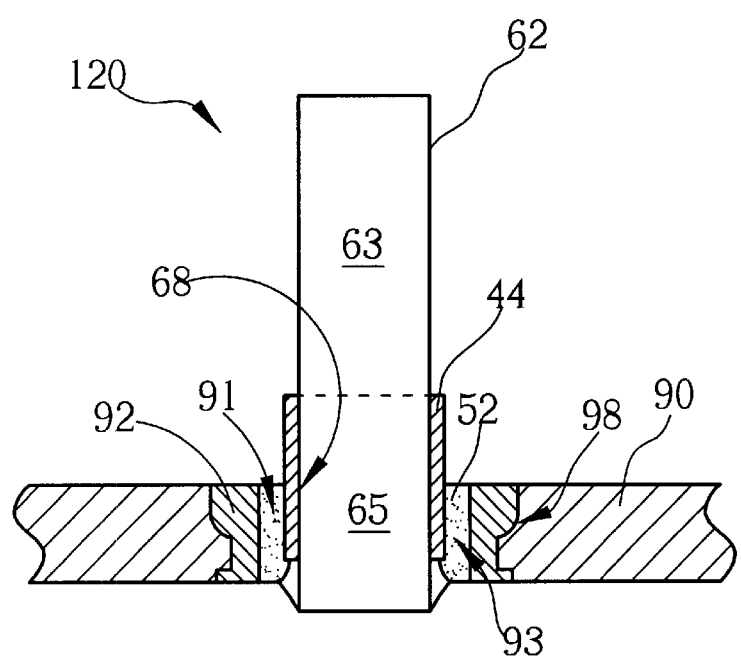
FIG. 14 is a cross-sectional diagram of the present invention fourth embodiment pointing stick device 120.

Please refer to FIG. 14. FIG. 14 is a cross-sectional diagram of the present invention fourth embodiment pointing stick device 120. The present invention fourth embodiment pointing stick device 120 comprises a stick 62, a base plate 90, a base stand 92, at least one strain gauge 44 and a binding compound 52. The stick 62 has an upper portion 63 and a lower portion 65. The lower portion 65 is contained and fixed in an aperture 91 of the base stand 92, vertically fixing the stick 62 on the base plate 90. The base plate 90 has an aperture 93 with a downwardly tapering surface 98, and the base stand 92 is installed in the aperture 93 of the base plate 90 by an insert-molding method. In this case, the interface between base stand 92 and the base plate 90 is slidably fixed rather than glue-fixed.

The binding compound 52 is used to fill the space between the lower portion 65 of the stick 62 and the aperture 91 of the base stand 92 in order to fix the lower portion 45 of the stick 42 vertically to the base plate 90. The binding compound 52 is a solid material, such as epoxy.

Figure 15:
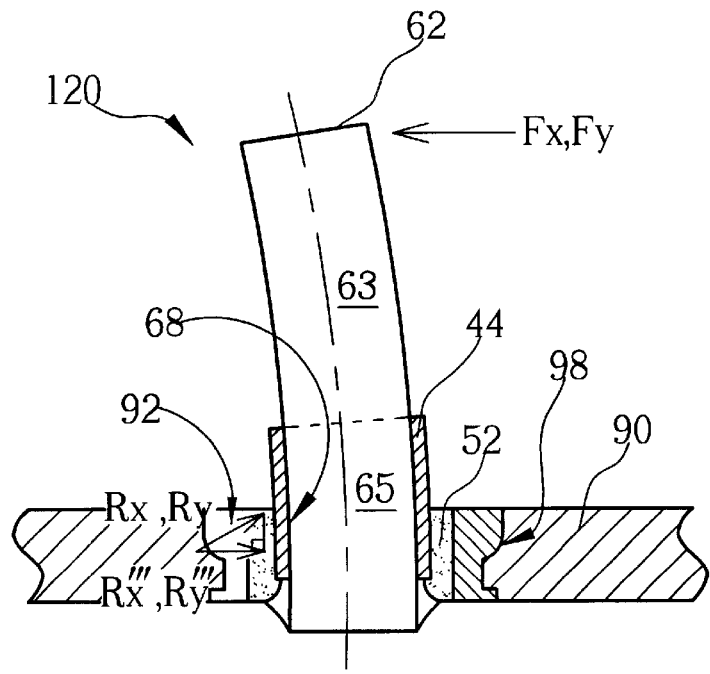
FIG. 15 is a cross-sectional diagram of the present invention fourth embodiment pointing stick device 120 under a horizontal force in the X and Y directions.

Please refer to FIG. 15. FIG. 15 is a cross-sectional diagram of the present invention fourth embodiment pointing stick device 120 under a horizontal force in the X and Y directions. The central line shown in FIG. 15 represents the bending direction of the stick 62 from the horizontal force. When a horizontal force $F_x$, $F_y$ in the X and Y directions is applied to the present invention pointing stick device 120, as with the prior art pointing stick device shown in FIG. 3, the bending of the stick 62 makes the strain gauges 44 generate bending strain signals $S_{x1}$, $S_{y1}$. In addition, the reaction forces $R_x'''$, $R_y'''$, a normal component (normal to the column-shaped surface 68) of the reaction forces $R_x$, $R_y$ (normal to the downwardly tapering surface 98) generated by the horizontal force $F_x$, $F_y$ through the binding compound 52 and the base stand 92, squeeze the strain gauges 44, causing the strain gauges 44 to generate strain signals $S_{x2}'''$, $S_{y2}'''$. In this case, the totality of strain signals of the present invention pointing device 120 under a horizontal force in the X and Y directions is $S_{x1}+S_{x2}'''$, $S_{y1}+S_{y2}'''$.

Figure 16:
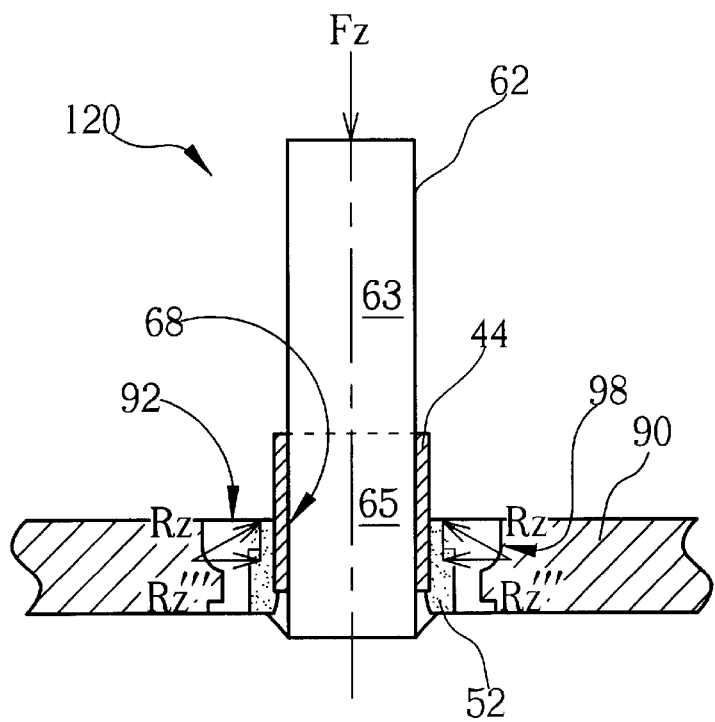
FIG. 16 is a cross-sectional diagram of the present invention fourth embodiment pointing stick device 120 under a vertical force in the Z direction.

Please refer to FIG. 16. FIG. 16 is a cross-sectional diagram of the present invention fourth embodiment pointing stick device 120 under a vertical force in the Z direction. The central line shown in FIG. 16 represents the direction of compression of the stick 62 from the vertical force. When the present invention pointing stick device 120 is under a vertical force $F_z$, as with the prior art pointing stick device shown in FIG. 4, the compression of the stick 62 makes the strain gauges 44 generate compressive strain signals $S_{z1}$. In addition, the normal reaction forces $R_z'''$, a normal component (normal to the column-shaped surface 68) of the reaction forces $R_z$ (normal to the downwardly tapering surface 98) generated by the vertical force $F_z$ through the binding compound 52 and the base stand 92, squeeze the strain gauges 44, causing them to generate strain signals $S_{z2}'''$. In this case, the totality of strain signals of the present invention pointing device 120 under a vertical force in the Z direction is $S_{z1}+S_{z2}'''$.

In the contrast to the prior art pointing stick device 10, 30, the lower portion 45 of the stick 42 of the present invention pointing stick device 40, 80 has a tapering section 46, and the lower portions of the strain gauges 44 extend into the tapering section 46 of the stick 42. The strain gauges can easily sense the vertical downward pressure of the stick 42. Likewise, although the lower portion 65 of the stick 62 of the present invention pointing stick device 100, 120 is of a vertical, columnar shape, the corresponding aperture 51, 93 is of a downwardly tapering conic shape and, therefore, the strain gauges can easily sense the vertical downward pressure of the stick 42. The present invention pointing stick device 40, 80, 100, or 120 increases the sensitivity of the strain signals in the Z direction, as well as in the X and Y directions.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A pointing stick device for use with a computer comprising:

a base plate having an aperture;

a stick having an upper portion, and a lower portion with a tapering section;

at least one strain gauge installed on the lower portion for sensing pressure and generating corresponding sensing signals; and a binding compound filling the space between a periphery of the lower portion of the stick and the aperture of the base plate and covering at least a portion of the strain gauge, for fixing the lower portion of the stick vertically in the aperture of the base plate;

wherein when the stick is vertically depressed, the strain gauge installed on the periphery of the lower portion of the stick can sense vertical downward pressure from reaction forces transmitted through the binding compound and generate the corresponding sensing signals.

2. The pointing stick device of claim 1 wherein the tapering section of the stick is of a four-faced pyramidal shape, the pointing stick device comprises a strain gauge installed on each of the four faces of the tapering section to sense the vertical downward pressure and to generate the corresponding sensing signals.

3. The pointing stick device of claim 1 wherein the binding compound is formed of epoxy.

4. The pointing stick device of claim 1 wherein the aperture of the base plate is of a downwardly tapering cone shape for containing and fixing the tapering section of the lower portion of the stick.

5. The pointing stick device of claim 1 wherein the aperture of the base plate is of a vertical columnar shape.

6. The pointing stick device of claim 1 wherein the base plate is a printed circuit board (PCB) having at least one conductor on its bottom, and wherein another conductor is attached to a bottom end of the stick to electrically connect to the strain gauge, and the conductor at the bottom end of the stick is soldered to the conductor at the bottom of the circuit board to transmit the sensing signals generated by the strain gauge.

7. The pointing stick device of claim 1 further comprising a flexible printed circuit board installed at the bottom of the base plate wherein at least one conductor is attached to the circuit board, and wherein another conductor is attached to a bottom end of the stick to electrically connect to the strain gauge, and the conductor at the bottom end of the stick is soldered to the conductor at the bottom of the circuit board to transmit the sensing signals generated by the strain gauge.

8. A pointing stick device for use with a computer comprising:

a base plate having an aperture;

a stick having an upper portion, and a lower portion;

at least one strain gauge installed on a periphery of the lower portion of the stick for sensing pressure and generating corresponding sensing signals; and a base stand downwardly tapering in shape and installed between the aperture of the base plate and the lower portion of the stick for vertically fixing the stick to the base plate;

wherein when the stick is vertically depressed, reaction forces generated by the aperture of the base plate to the base stand will force the base stand to inwardly squeeze the strain gauge installed on the periphery of the lower portion of the stick to cause the strain gauge to sense vertical downward pressure and generate corresponding sensing signals.

9. The pointing stick device of claim 8 wherein the lower portion of the stick has a tapering section, the tapering section of the stick is of a four-faced pyramidal shape, the pointing stick device comprises a strain gauge installed on each of the four faces of the tapering section to sense the vertical downward pressure and to generate the corresponding sensing signals.

10. The pointing stick device of claim 8 wherein the aperture of the base plate is a downwardly tapering conic shape, and the base stand is formed of epoxy for fixing the lower portion of the stick in the conical aperture of the base plate.

11. The pointing stick device of claim 8 wherein the aperture of the base plate is of a downwardly tapering conic shape, and the base stand is molded plastic fixed around the lower portion of the stick in the aperture of the base plate.

12. The pointing stick device of claim 8 wherein the base plate is a printed circuit board (PCB) having at least one conductor at its bottom, and wherein another conductor is attached to a bottom end of the stick to electrically connect to the strain gauge, and the conductor at the bottom end of the stick is soldered to the conductor at the bottom of the circuit board for transmitting the sensing signals generated by the strain gauge.

13. The pointing stick device of claim 8 further comprising a flexible printed circuit board installed at the bottom of the base plate wherein at least one conductor is attached to the circuit board, and wherein another conductor is attached to a bottom end of the stick to electrically connect to the strain gauge, and the conductor at the bottom end of the stick is soldered to the conductor at the bottom of the circuit board for transmitting the sensing signals generated by the strain gauge.

14. The pointing stick device of claim 8 wherein the base stand has a vertical column-shaped aperture in its center portion, and the lower portion of the stick is fixed in the aperture of the base stand by a binding compound.

15. The pointing stick device of claim 14 wherein the binding compound is formed of epoxy.

* * * * *